June 27, 1967 J. JULLIEN-DAVIN 3,327,678
MECHANICAL DEVICE FOR THE SELECTION OF MEASUREMENT RANGES AND
FOR THE AUTOMATIC DISPLAY OF SELECTED RANGES
Filed Oct. 23, 1963 4 Sheets-Sheet 1

INVENTOR
JEAN JULLIEN-DAVIN
By SPARROW and SPARROW
ATTORNEYS

June 27, 1967  J. JULLIEN-DAVIN  3,327,678
MECHANICAL DEVICE FOR THE SELECTION OF MEASUREMENT RANGES AND
FOR THE AUTOMATIC DISPLAY OF SELECTED RANGES
Filed Oct. 23, 1963  4 Sheets-Sheet 2
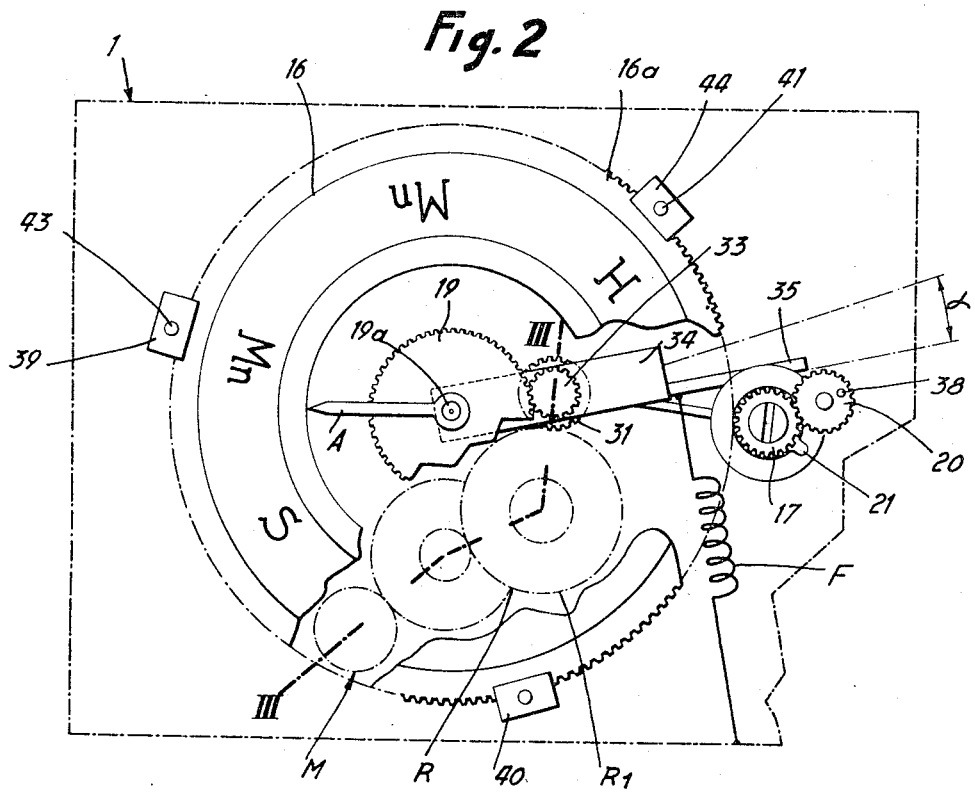
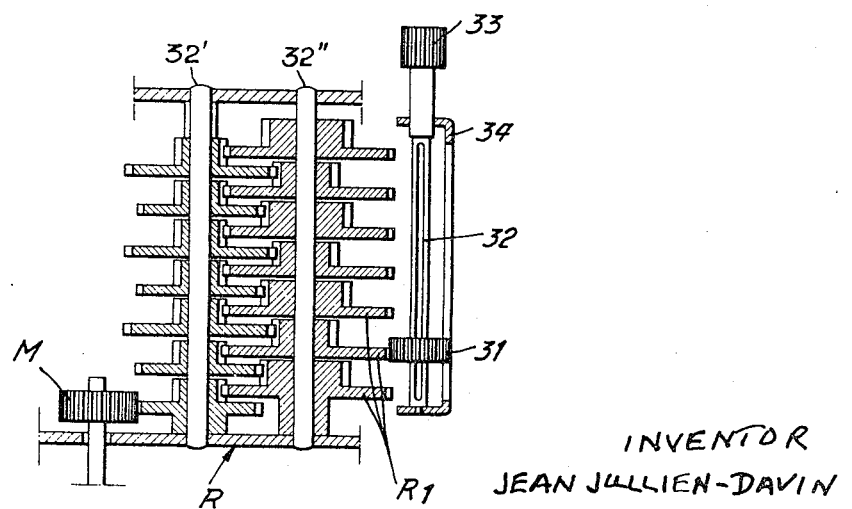
INVENTOR
JEAN JULLIEN-DAVIN
BY
SPARROW and SPARROW
ATTORNEYS

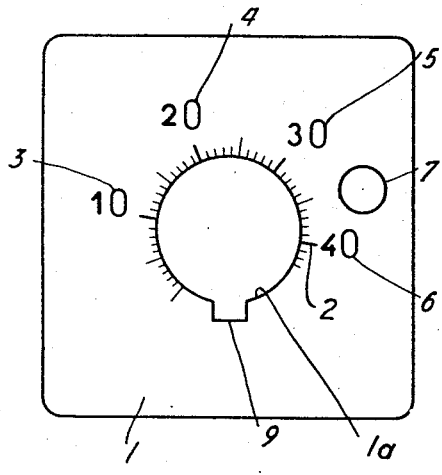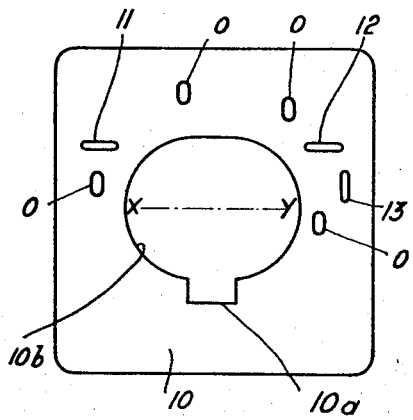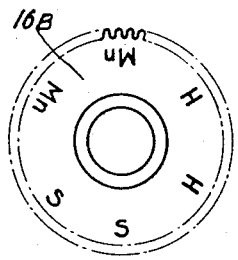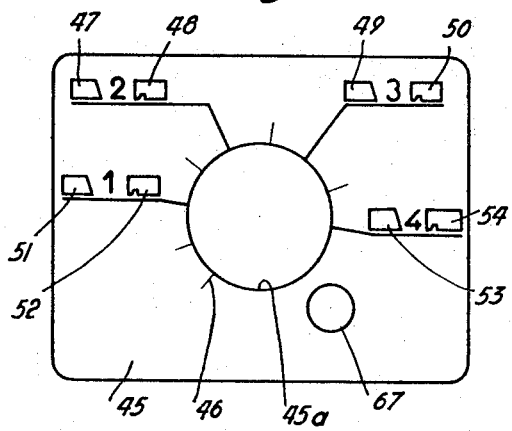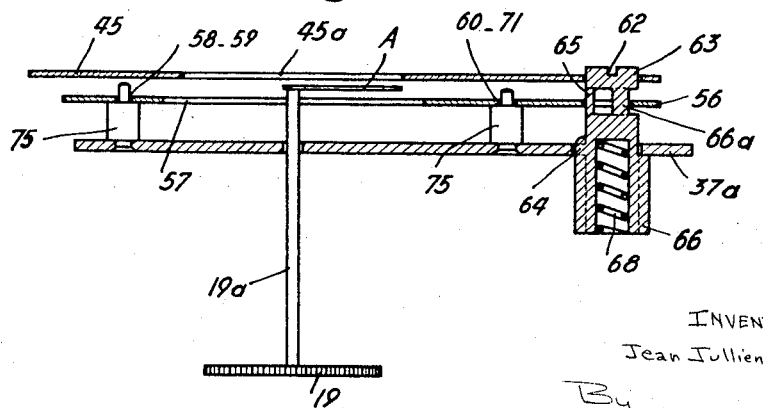

June 27, 1967  J. JULLIEN-DAVIN  3,327,678
MECHANICAL DEVICE FOR THE SELECTION OF MEASUREMENT RANGES AND
FOR THE AUTOMATIC DISPLAY OF SELECTED RANGES
Filed Oct. 23, 1963  4 Sheets-Sheet 4

INVENTOR
Jean Jullien Davin
By
Sparrow and Sparrow
ATTORNEYS

United States Patent Office 3,327,678
Patented June 27, 1967

3,327,678
MECHANICAL DEVICE FOR THE SELECTION OF MEASUREMENT RANGES AND FOR THE AUTOMATIC DISPLAY OF SELECTED RANGES
Jean Jullien-Davin, Valence, France, assignor to Crouzet, Valence, France, a French company
Filed Oct. 23, 1963, Ser. No. 318,283
Claims priority, application France, Oct. 24, 1962, 632, Patent 1,351,432
11 Claims. (Cl. 116—129)

The present invention relates to a mechanical device for the selection of measurement ranges and for the automatic display of the scales corresponding to the selected ranges, the measurement to be taken being applicable to any measurable value such as time intervals.

The object which the present invention seeks to achieve is to display in corresponding relation to each measurement range which has been selected, a scale or system of units, thereby permitting direct reading of the value which is measured and thus avoiding the errors which are liable to arise from the use of conventional instruments when the read value has to be multiplied or divided by a coefficient, especially when said value is of a high order or differs by a multiple of 10.

Single-control devices are already known which make it possible in an electrical multiple-purpose meter to effect simultaneously the selection of measurement ranges and the display of scales corresponding to the ranges which have been selected, but the selector means of such devices comprise switching means for the purpose of associating a galvanometer with sets of resistors, capacitors, etc.

The device in accordance with the invention can be associated with instruments both for measurement and checking of any measurable value and is entirely mechanical. Said device is characterized in that it comprises a single-control unit which is operatively connected, on the one hand, to at least one auxiliary movable dial on which are marked numerals and which is adapted to move behind a main stationary dial provided with a graduated scale and with windows which are located next to said graduated scale and in which are displayed the numerals of said auxiliary dial and, on the other hand, to a speed-changing mechanism in which the driving member is intended to be coupled to those means whose movement is to be checked or measured, whilst the driven member or each driven member of said speed-changing mechanism is operatively connected to a pointer which is intended to move in front of the graduated scale of the main stationary dial.

Further particular features and characteristics of the new device will be brought out by the description which follows below and which relates to a few examples of practical application of the device in accordance with the invention, said examples being given without implied limitation and illustrated diagrammatically in the accompanying drawings, in which:

FIG. 2 is a plan view of FIG. 1 wherein the main dial and the auxiliary dial are assumed to have been removed;

FIG. 3 is a view in elevation of the speed-changing mechanism;

FIG. 4 is a plan view, on a smaller scale, of the stationary main dial;

FIG. 5 is a plan view of the movable auxiliary dial, said view being shown in the same scale as the preceding;

FIG. 6 is a plan view, on a smaller scale, of an alternative form of embodiment of the range indicator dial;

FIG. 7 is a view in elevation and in partial cross-section of a portion of an alternative form of the apparatus of FIGS. 1 to 5;

FIG. 8 is a plan view of a stationary main dial designed for a system comprising a plurality of reading scales both above and below one unit and intended to be employed in conjunction with the alternative form of FIG. 7;

Figure 1:
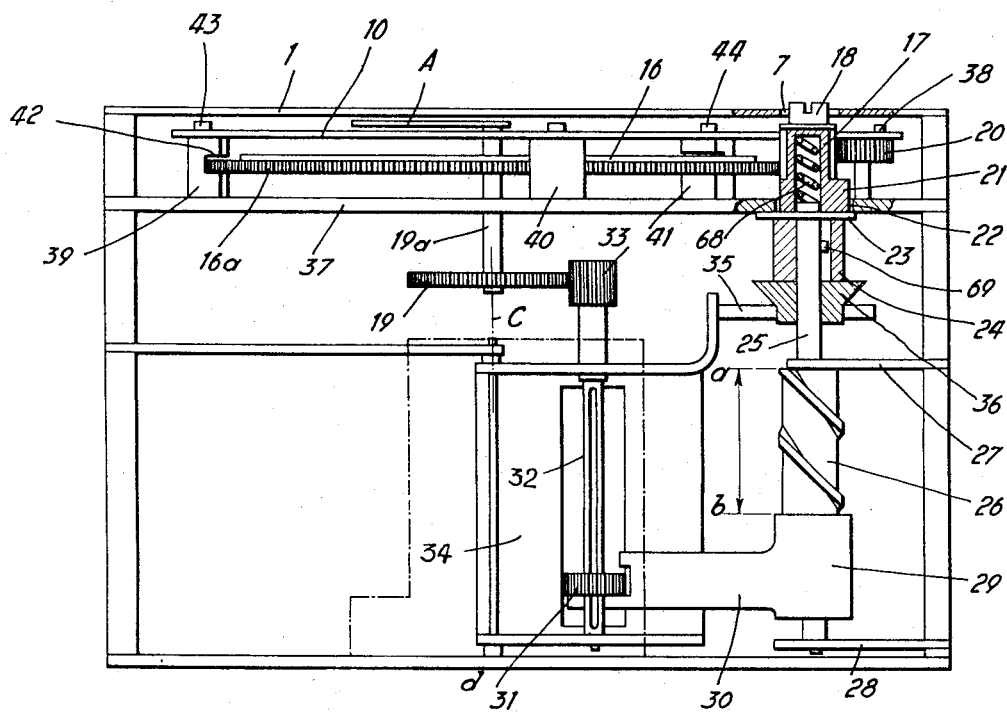
FIG. 1 is a view in elevation and in partial cross-section of a first form of embodiment of the device which is assumed to be designed to permit the measurement of a time interval, the speed-changing mechanism having been represented by its outline for the sake of clarity of the drawing.

In the form of embodiment which is illustrated in FIGS. 1 to 5, the device comprises a fixed mounting plate 37, above which is provided stationary dial 1 consisting of a perforated plate (as shown in FIG. 4) in which is formed a central and circular opening 1a, a graduated scale 2 being provided around said central opening. The plate 1 is perforated to form windows 3, 4, 5 and 6 through which the indications can be observed which appear on an auxiliary sliding dial 10 shown in FIG. 5 placed under said stationary dial.

The stationary dial 1 is additionally provided with an opening 7 through which passes a range selecting knob 18 integral with a pinion 17 able to slide axially on a pin 25. The periphery of the central opening 1a of the dial 1 comprises a recess 9 which makes it possible to read a range or scale indicated by a disc or indicator dial 16.

The sliding dial 10 consists of a perforated plate (as shown in FIG. 5) which is slidingly supported on pillars 39, 40 and 41 and is provided with an oblong window 10b and three elongated slots 11, 12 and 13, the slots 11 and 12 being intended to receive guiding studs 43 and 44 which respectively form part of the pillars 39 and 41. The elongated slot 13, which is oriented at right angles to the elongated slots 11 and 12, is intended to receive the crank-pin 38 of a pinion 20 (in mesh with the pinion 17), the rotary motion of which accordingly imparts to the sliding dial 10 a rectilineal reciprocating movement of translation along the axis $x$–$y$ (see FIG. 5) so as to permit the zeros "0" which are either engraved or printed on said sliding dial either to appear in or disappear from the windows 3, 4, 5 and 6 of the stationary dial 1, depending on whether the sliding dial is either pulled back or thrust forward by the stud 38 of the pinion 20. A recessed portion 10a, which is provided in the oblong opening window 10b of the sliding dial 10, makes it possible (as is the case with the recessed portion 9) to read the range or scale which is displayed by the indicator dial 16.

The indicator dial 16 is integral with an externally toothed ring 16a which meshes with the range-selecting pinion 17. Said indicator dial is held centered in grooves 42 formed in the pillars 39, 40 and 41 which are fixed on mounting-plate 37. The ranges "S," "Mn" and "H" are each marked twice on the uppermost face of the indicator dial 16, one of the unit designations (S, Mn, H) being employed for the coefficient "1" while the other designation of the same unit is employed for the coefficient "10." The units referred-to above correspond in this case to time indications (seconds, minutes, hours).

In the alternative form which is represented in FIG. 6, the indicator dial 16B is a toothed disc.

The movable dial 10 and the range-indicator dial 16 are actuated by a set of components driven from the selector pinion 17 which is, in turn, controlled by means of the knob 18 which may have a driver slot or may be knurled.

In addition to the set of teeth of the selector pinion 17 which transmits the rotary motion of the said pinion 17 to the pinion 20 (and therefore to the sliding dial 10) as well as to the selector dial 16 through the intermediary of the ring-gear 16a, said selector pinion 17 is provided with a locking lug 21 normally engaging a notch or recess 22 provided in the mounting plate 37. The purpose of said lug is to ensure reliability of operation (disengagement and interlocking of mechanical components). The pinion 17 is also provided with a bearing flange integral with a cylindrical body 24. Axial bores are formed through said flange and said body and also within the pinion 17, said bores being able to accommodate a compression spring 68 together with the end or head of pin 25, the ends of said spring being applied respectively against said head and against the bottom of the axial bore formed in the pinion 17.

Pin 25 comprises a lug 69 which is adapted to slide within a longitudinal groove or channel opening in the axial bore of the body 24, with the result that the selector pinion 17 is capable of sliding along the pin 25 while being nevertheless fast for rotation with this latter.

Pin 25 extends between two mounting-plates 27 and 28 and is integral with a worm-screw 26 which is engaged with a sliding nut 29, there being formed on said sliding nut a fork 30 which is intended to displace axially a sliding pinion 31 which is designed to slide along a shaft for example by means of a conventional key and keyway 32 while being fast for rotation with said shaft.

There is secured to the top portion of the shaft 32 a pinion 33 which is intended to come into engagement with a pinion 19 which is keyed on the shaft 19a of an indicator pointer A, said pointer being designed to move above the graduated scale 2 of the stationary dial 1.

The shaft 32 is rotatably mounted in a cage 34 which is capable of pivoting about an axis $c-d$ (said axis being actually located in the line of extension of the shaft 19a) and which is provided with a disengaging finger 35. The cage 34 supports a speed-changing mechanism R (as shown in FIGS. 2 and 3). Speed-changing R mechanism comprises a series of gear-trains disposed along two shafts 32′ and 32″ parallel to the axis $c-d$, all the pinions being actuated as a single unit by a driving pinion M with each driven pinion being integral with a gear wheel R1.

Normally the pinion 31 engages any one of the wheels R1, all having the same diameter. The finger 35 permits the disengagement of the sliding pinion 31 when said finger pivots together with the cage 34 about the axis $c-d$ under the action of the radial thrust applied by a disengaging cone 36 which is integral with the body 24 and is therefore capable of axial movement. In fact, when the cage 34 performs a pivotal movement and swings away from the shaft 25, the contact between the sliding pinion 31 and that gear-wheel R1 with which said pinion was engaged is accordingly interrupted. A restoring spring F tends to bring back the cage 34 into the engaged position when the cone 36 no longer applies radial thrust on the finger 35. In the disengaged position of the cage 34, it is possible to bring the sliding pinion (when it is lifted or lowered by the fork 29 as a result of the pivoting of the pinion 17) opposite any one of the driven gear-wheels R1.

The pitch of the worm-screw 26 permits the range-selecting pinion 17 to perform a number of revolutions which corresponds to the number of gears R1 of the speed-changing unit R (and consequently to the number of speeds) in respect of a lineal displacement $a-b$.

The disengagement angle $\alpha$ (angle of pivotal motion of the cage 34 together with its finger 35) has a value such that the teeth of the sliding pinion 31 are not liable to engage with the teeth of the different gear-wheels R1 as said pinion is displaced axially.

When pressure is applied on the selector pinion 17, by depressing the knob 18 which is integral with said pinion, the locking lug 21 is accordingly released from the notch or recess 22 or of the plate 37. This action has the effect of compressing the spring 68 which is housed within said selector pinion and an axial thrust is applied on the disengaging cone 36 which produces action on the finger 35 which is accordingly displaced from its rest position (which corresponds to the engagement of the sliding pinion 31) and causes the cage 34 to pivot about the axis $c-d$.

When the lug 21 of the selector pinion 17 has been released from the recess 22 of the mounting-plate under the action of the thrust referred-to above, it is possible to cause said pinion to rotate so as to carry out the selection of measurement ranges or scales. As soon as the rotation of said pinion is initiated, the different components 17, 23, 24 and 36 are held in the depressed or disengaged position by the lug 21 which is brought to bear against the underface of the mounting-plate 37.

If the selector pinion 17 is caused to rotate further until the designation of the range which has been chosen (namely S, Mn, H) appears in the recessed portion 9 of the stationary dial 1 and in the recessed portion 10a of the moving dial 10, the indication of the coefficient which is assigned to said range or scale is caused to appear in the windows 3, 4, 5 and 6. When the selection has been completed, the finger 21 is again in line with the notch or recess 22; under the action of the spring 68, the selector pinion 17 engages said recess and is again locked and the axial movement of said pinion to which the lifting movement of the cone 36 corresponds, permits the engagement of the sliding pinion 31 with that gear-wheel R1 which corresponds in a speed-changing mechanism R to the range which has been selected.

In another form of embodiment of the device, in which the dial 16 of the previous arrangement has been dispensed with, the device comprises, in accordance with the arrangement shown in FIGS. 7 to 14, a stationary dial (FIGS. 7 and 8) which is constituted by a perforated plate 45 at the centre of which is formed a circular opening 45a surrounded by a graduated scale 46. Windows 47, 48, 49, 50, 51, 52, 53 and 54 (as shown in FIG. 8 and FIGS. 9 to 12) make it possible to observe the indications which appear on a movable dial 56 (FIGS. 7 and 13) located behind said windows.

Figure 13:
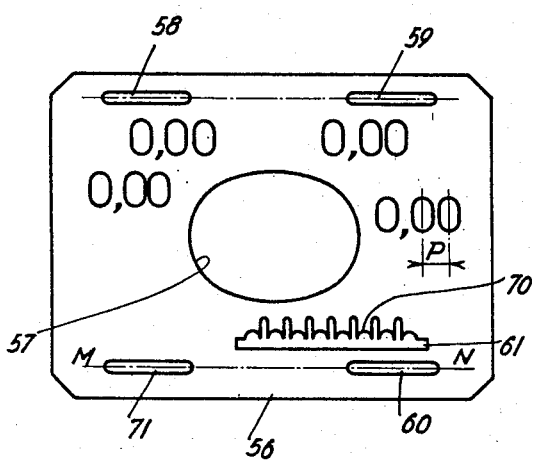
FIG. 13 is a plan view of a movable dial which can be placed beneath the stationary dial of FIG. 8 and which comprises a toothed rack-shaped window allowing the step-by-step displacement of said dial.

The windows 47, 49, 51 and 53 have a shape in which provision is made for the appearance of a decimal point (FIG. 9) which is placed, starting from the left hand side, between the first and second zero of each series of zeros of the moving dial 56 (as shown in FIG. 13) when the unit is divided by a submultiple of 10.

Figure 9:
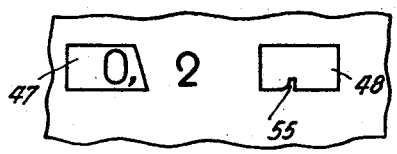
FIGS. 9 to 12 show different shapes of windows which can be formed in the dial of FIG. 8.
Figure 10:
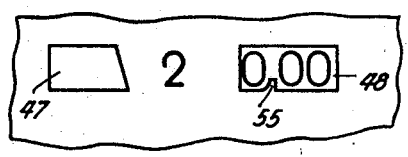

The windows 48, 50, 52 and 54 each are provided with a small tongue 55 (as shown in FIGS. 9 and 10) which masks the decimal point when the unit is multiplied by the maximum coefficient of the scale.

The system of windows hereinabove described can naturally be replaced by any other system which achieves the same result. It accordingly follows, for example, that when the windows 47a are cut away in the manner which is illustrated in FIGS. 11 and 12, each window accordingly permits the decimal point to appear, said decimal point being either engraved or printed on the moving dial in a lower position than in the preceding arrangement.

Figure 11:
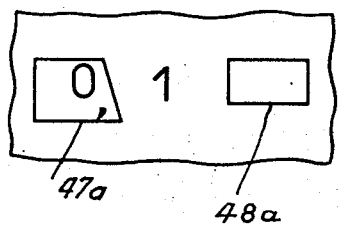
Figure 12:
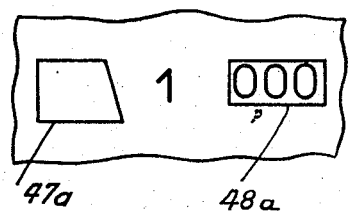

The windows 48, 50, 52 and 54 can also be replaced by windows of another type which achieve the same result, for example windows 48a of the type which is illustrated in FIGS. 11 and 12. In this case, the decimal point of the auxiliary dial is masked as a result of the smaller depth to which said window is cut.

The stationary dial 45 is additionally pierced with a hole 67 for the free insertion therethrough of the range-selecting control member.

The movable dial 56 (as shown in FIGS. 7 and 13) which is adapted to perform a rectilineal movement of translation along the axis M–N in FIG. 13 consists of a perforated plate provided at the centre with an oblong opening 57 having a shape such that, in the end positions of said dial, the edges of said opening do not encroach on the opening 45a of the stationary dial 45 which is located above said movable dial.

Figure 14:
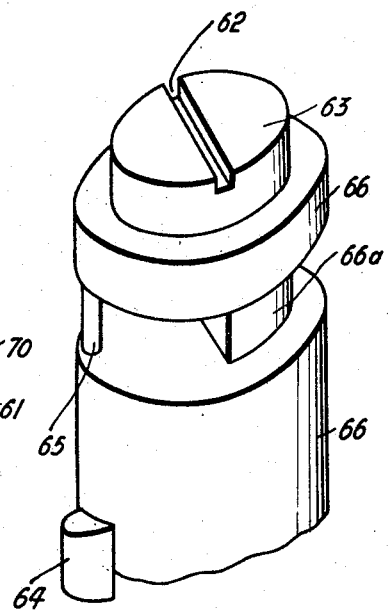
FIG. 14 is a perspective view of that portion of the control means which is intended to initiate the step-by-step displacement of the dial of FIG. 13.

The movable dial 56 is provided, on the one hand, with elongated slots 58, 59, 60 and 71 which serve as guides or slideways for guide studs formed on small columns 75 fixed on a mounting-plate 37a and, on the other hand, with an opening 61 which is cut to a special shape for the purpose of receiving the head of a control system (as shown in FIGS. 7 and 14) which transforms a circular movement into a step-by-step movement so that the pitch for one full revolution of said control head is equal to P (see FIG. 13). Sets of zeros are engraved or printed at well determined points of the dial 56 which correspond to the positions of the windows of the stationary dial 45 (as shown in FIG. 8). The number of zeroes of each set represents the maximum value of the coefficient of the scale, while said number can vary in each particular case.

The control system for actuating the movable dial 56 comprises in this case a range-selecting knob 63 in which is formed a screw-driver slot 62. The knob 63 forms part of a cylindrical body 66 which is recessed in such a manner as to provide an operating stud 65 and a semicircular heel-shaped projection 66a.

The body 66 is provided, on the one hand, with a locking lug 64 and, on the other hand, with an axial housing which is intended to accommodate compression spring 68. Apart from this feature, the design of the range-selecting knob 63 is similiar to the other portions of the range-selecting pinion 17 of the preceding form of embodiment and the device comprises the same speed-changing means and the same means for engaging and disengaging the sliding pinion. The aforesaid means are not illustrated in FIG. 7 and will not be described.

The operation of the above alternative form of the device in accordance with the invention is as follows:

When pressure is applied on the range-selecting knob 63, for example by means of a screw-driver which is engaged in the slot 62, the locking lug 64 is released from its recess in the mounting-plate 37a and is then engaged beneath said mounting plate. As a consequence, the pinion normally driven by the speed-changing mechanism is disengaged from said mechanism as in the previous form of embodiment. Said selector knob is then caused to rotate and thus to displace the moving dial 56 in such a manner that the scale selected is displayed in a corresponding window of the stationary dial 45. During this movement of rotation of the knob 63, the operating stud 65 penetrates inside one of the recesses 70 of the indented opening 61 and causes said movable dial to be displaced through one or a number of divisions depending on the number of turns which has been given to the selector knob 63 in order to obtain the desired range or scale. When said range is displayed, the locking lug 64 is again located in line with the recess provided for this latter in the mounting-plate 37a and it is merely necessary to stop exerting pressure on the selector knob 63 in order to permit this latter to return upwards to its rest position and thus be automatically locked. At this moment, the semicircular heel-shaped projection 66a is accordingly located inside one of the recesses 70 of the indented opening 61 and rigidly locks the moving dial in the position to which it has been brought.

It is obvious that instead of being coupled to a time-recording mechanism (as has been assumed in the specific examples given above), the driving pinion M can be operatively connected to any unit having a reading scale which can be accordingly modified and simultaneously displayed by the device. Furthermore it will be understood that the examples of embodiment of the new device which have been described in the foregoing and which have been illustrated in the accompanying drawings have been given solely by way of indication without any limitation being implied and that any and all detail modifications can be made therein.

What I claim is:

1. Mechanical device for the selection of measurement ranges and for the automatic display of measurement scales corresponding to the ranges which have been selected, said device comprising: a stationary main support, a stationary main plan dial mounted on said support, said main dial having a circular graduated scale, said scale having figures and having windows located beside said figures, a rotatable indicator pointer arranged for moving in a plan parallel to said stationary main dial about an axis perpendicular to said plan, said pointer being the geometric center of said circular scale, a slidable dial below said stationary dial and parallel thereto, said slidable dial slidably arranged in its own plan, said slidable dial having indications of scales able to appear in said windows according to the position of said slidable dial, a speed change unit having a driving member responsive to a measurable variable and having a plurality of driven members, each one of said driven members corresponding to a speed ratio, coupling means operatively connected to said rotatable indicator pointer, said coupling means arranged for being connected to any one of said driven members of said speed change unit, common rotatable and axially slidable control means carried by said stationary main support, selecting means for actuating said coupling means and for bringing the same into any one position corresponding to said connection with any one of said driven members of said speed change unit, first transmission means operatively connecting said slidable dial to said common rotatable and slidable control means for moving said dial according to the rotational movement of said control means, second transmission means operatively connecting said common rotatable and slidable control means to said selecting means for changing according to the rotational movement of said control means the position of said coupling means with respect to said driven members of said speed change unit, simultaneously with the movement imparted to said slidable dial, and third transmission means operatively connecting said common rotatable and slidable control means to said coupling means for bringing said control means into an inoperative position, when said control means is moved axialy, so that said common control means are capable, when activated, of producing the displacement of said sliding dial, of selecting of one of said speed ratios in said speed change unit and of temporarily disengaging said coupling means for temporarily disconnecting of said indicator pointer and said speed change unit during said selection of one of said speed ratios and of said change of position of said slidable dial.

2. Device as claimed in claim 1, further comprising: a second scale-indicating rotatable dial arranged in parallel relation beneath said first slidable dial, said second rotatable dial having indications showing the measurement scale being used, and operatively connected to said common-control means.

3. Device as claimed in claim 1, and said speed change unit comprising two groups of pairs of gears, two shafts parallel to one another and parallel to said axis of rotation of said indicator pointer, each one of said groups of gears being rotatable on said shafts, said pairs of gears comprising a pinion integral with a gear wheel, said gears forming a kinematic chain, one of said gear wheels of one of said groups being in mesh with said driving rotatable member responding to said measurable variable, said gear wheels of said other group, having all the same diameter, said coupling means comprising a pivotable cage able to pivot about said axis of rotation of said indicator pointer, a shaft carrier by said cage parallel to said pivoting axis of said cage, a first pinion fixed on said parallel shaft, said pinion operatively connected to said indicator pointer, and a second pinion axially slidably arranged along said parallel shaft, said second pinion driven by said shaft for engaging any one of said gear wheels of said other group and for being disengaged therefrom when said cage performs a pivotal movement, withdrawing from said gear wheels.

4. Device as claimed in claim 3, and said speed-selecting device further comprising: a rotatable worm-screw; a coupling connecting said worm-screw to said common-control means; a sliding nut engaging said worm-screw; and a fork forming one piece with said sliding nut said fork engaging said slidable pinion for displacing said slidable pinion axially with respect to the said driven gear-wheels.

5. Device as claimed in claim 3, and said coupling means comprising a cone said cone axially movable by said common-control means, in a direction parallel to said shafts of said speed-change unit, a finger on said cage, said finger cooperating with said cone for causing said cage to perform a pivotal movement in a direction corresponding to the separation of said sliding pinion from said driven gear-wheels, and resilient restoring means on said cage for re-engaging of said sliding pinion with any one of the driven gear-wheels.

6. Device as claimed in claim 1, and said common-control means comprising a rotatable and axially movable control knob said knob having a positioning lug engageable in a locking recess formed in said stationary main support, and resilient means for thrusting back axially said control knob causing said lug to engage in said recess.

7. Device as claimed in claim 6, and said control knob having peripheral teeth, and said first movable dial having first slots for performing a rectilineal movement of translation and having a second slot at right angles to said first slots, and transmission means consisting of a pinion meshing with said teeth of said control knob said pinion having an eccentric stud engaging said second slot of said movable dial.

8. Device as claimed in claim 4, and said control knob having an axial bore, a compression spring disposed within said axial bore, a stub shaft forming one piece with said worm-screw said shaft slidably arranged inside said axial bore, said stub shaft being subjected to the axial thrust of said compression spring, said shaft having a driving lug and having a bushing said bushing forming an integral part of said control knob, said bushing providing a passage for said stub shaft and having a longitudinal internal groove for accommodating said driving lug.

9. Device as claimed in claim 2, and said rotatable dial having a toothed circular periphery in mesh with said peripheral teeth of said control knob.

10. Device as claimed in claim 7, and said rotatable dial having a toothed circular periphery in mesh with said peripheral teeth of said control knob.

11. Device as claimed in claim 6, and said control knob having an axial bore, a compression spring disposed within said axial bore, a stub shaft forming one piece with said worm-screw, said shaft slidably arranged in said axial bore, said stub shaft being subjected to the axial thrust of said compression spring, said shaft having a driving lug and having a bushing, said bushing forming an integral part of said control knob, said bushing providing a passage for said stub shaft and having a longitudinal internal groove for accommodating said driving lug.

References Cited

UNITED STATES PATENTS

| | | | |
|---|---|---|---|
| 1,393,179 | 10/1921 | Starr | 177—204 |
| 2,024,115 | 12/1935 | Schwartz | 235—61 |
| 2,739,303 | 3/1956 | Erickson | 116—129 |
| 2,798,454 | 7/1957 | Gleeson | 116—57 |
| 3,047,220 | 7/1962 | George | 235—61 |
| 3,092,072 | 6/1963 | Strimel | 116—129 |

LOUIS J. CAPOZI, *Primary Examiner.*